(12) United States Patent
Canard

(10) Patent No.: US 6,354,117 B1
(45) Date of Patent: Mar. 12, 2002

(54) STEERING COLUMN ANTI-THEFT DEVICE FOR MOTOR VEHICLE

(75) Inventor: Louis Canard, Nevers (FR)

(73) Assignee: Valeo Securite Habitacle, Europarc Creteil (FR)

( * ) Notice: Subject to any disclaimer, the term of this patent is extended or adjusted under 35 U.S.C. 154(b) by 0 days.

(21) Appl. No.: 09/483,830

(22) Filed: Jan. 17, 2000

(30) Foreign Application Priority Data

Jan. 15, 1999 (FR) .............................. 99 00401

(51) Int. Cl.[7] .............................................. B60R 25/03

(52) U.S. Cl. ........................................ 70/186; 70/252

(58) Field of Search ......................... 70/182–186, 252, 70/368

(56) References Cited

U.S. PATENT DOCUMENTS

| | | | | |
|---|---|---|---|---|
| 1,510,823 A | * | 10/1924 | Betts ........................... | 70/185 |
| 3,320,782 A | * | 5/1967 | Turman ........................ | 70/388 |
| 3,599,455 A | * | 8/1971 | Pilvet ........................... | 70/363 |
| 4,427,967 A | * | 1/1984 | Maiocco ..................... | 340/52 D |
| 4,433,562 A | * | 2/1984 | Tsuchiya ..................... | 70/186 |
| 4,685,313 A | * | 8/1987 | Neyret ........................ | 70/186 |
| 5,036,686 A | * | 8/1991 | Ichinose ...................... | 70/186 |
| 5,271,252 A | * | 12/1993 | Yasuhara et al. ............ | 70/186 |
| 5,285,667 A | * | 2/1994 | Fukasawa et al. .......... | 70/379 R |
| 5,289,707 A | * | 3/1994 | Suzuki ........................ | 70/252 |
| 5,570,599 A | * | 11/1996 | Konii .......................... | 70/186 |
| 5,829,281 A | * | 11/1998 | Yamashita et al. ........... | 70/183 |
| 5,906,120 A | * | 5/1999 | Thacker et al. ............... | 70/186 |
| 5,974,841 A | * | 11/1999 | Naganuma ................... | 70/186 |
| 6,003,349 A | * | 12/1999 | Nagae et al. ................. | 70/186 |
| 6,233,986 B1 | * | 5/2001 | Suzuki et al. ................ | 70/186 |
| 6,237,378 B1 | * | 5/2001 | Canard ....................... | 70/252 |

FOREIGN PATENT DOCUMENTS

| | | |
|---|---|---|
| CH | 544 868 | 1/1974 |
| DE | 21 54 273 | 3/1973 |
| FR | 2 198 518 | 3/1974 |
| LU | 67 565 | 7/1973 |

OTHER PUBLICATIONS

French Search Report dated Oct. 26, 1999.
* cited by examiner

Primary Examiner—Lynne H. Browne
Assistant Examiner—John B. Walsh
(74) Attorney, Agent, or Firm—Morgan & Finnegan, LLP

(57) ABSTRACT

The disclosure relates to a motor vehicle steering column anti-theft device of the type including a casing in which a lock is mounted rotationally between an angular locking position in which a legitimate key can be axially introduced (conventionally from the rear towards the front) or removed, and at least one angular utilization position, in which said key cannot be extracted from the lock, said lock including a rotary projecting part forming a cam that can cooperate with a control finger carried by a bolt to control the axial movements of said bolt which can slide in said casing in an axial direction between two positions: a retracted position in which it is retracted into said basing, and a forward anti-theft position towards which it is pushed elastically and in which it projects from said casing axially via a hole in said casing and prevents a part on the steering column from rotating when said lock is in said locking position with said key extracted, wherein said bolt carries a locking finger projecting radially towards the axis of said casing and penetrating a locking recess formed in a lateral face of said projecting part when said bolt is in said forward anti-theft position, to prevent or limit movement of said bolt towards said retracted position; said locking finger is automatically pushed out of said recess during rotation of said lock from said locking position into said utilization position; and said bolt is held in said retracted position, in the presence of said key, by a mobile restraining mechanism which move to an inoperative position in which said bolt is no longer held when said key is withdrawn.

10 Claims, 7 Drawing Sheets

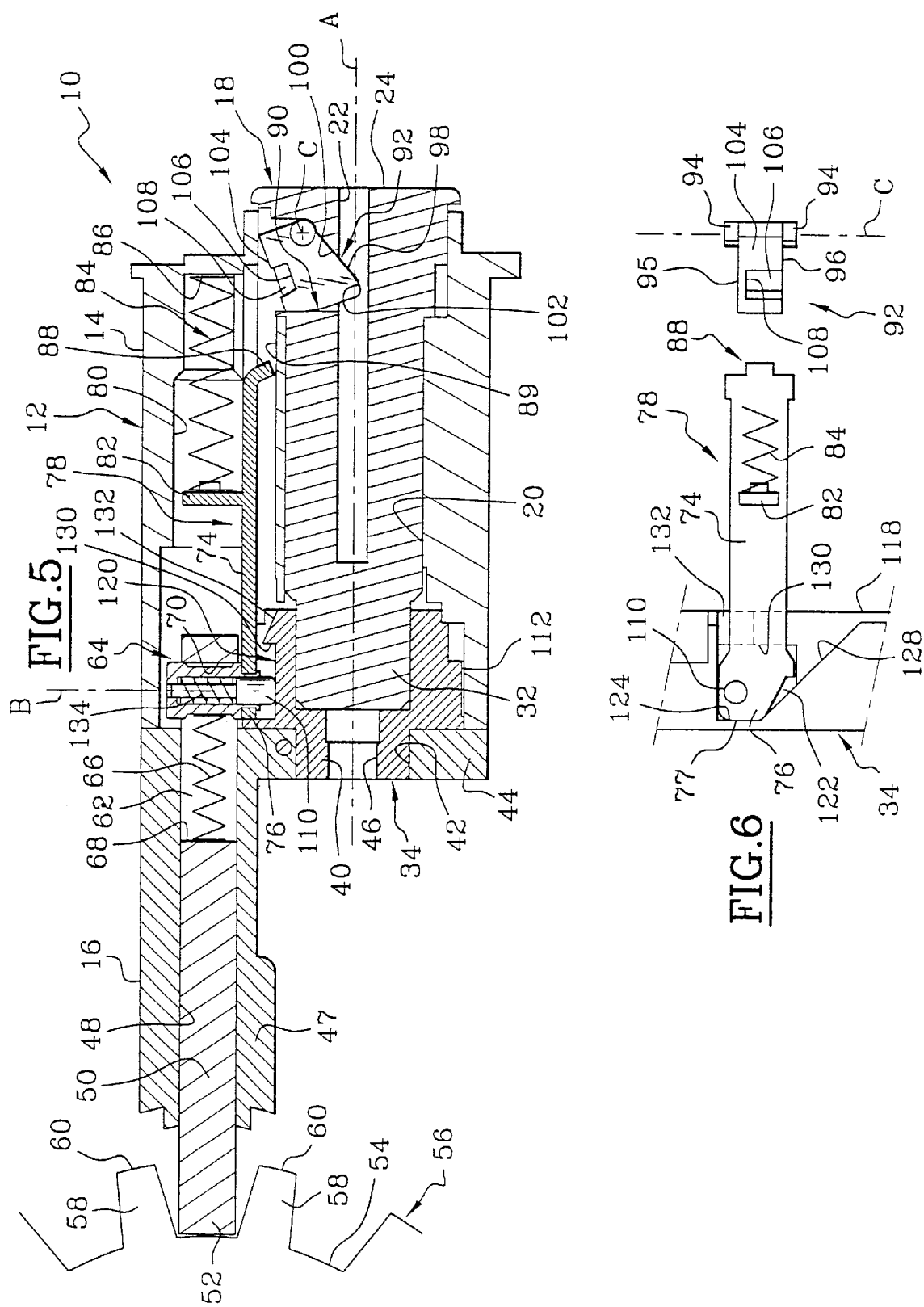

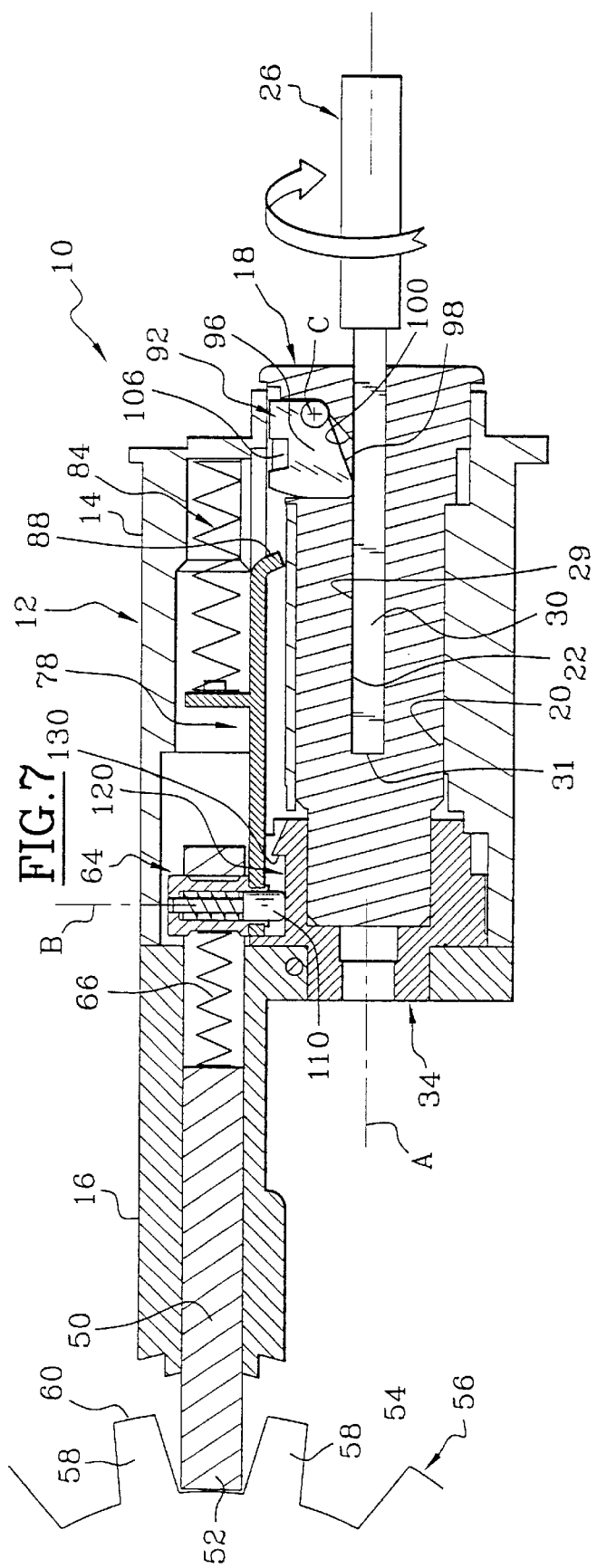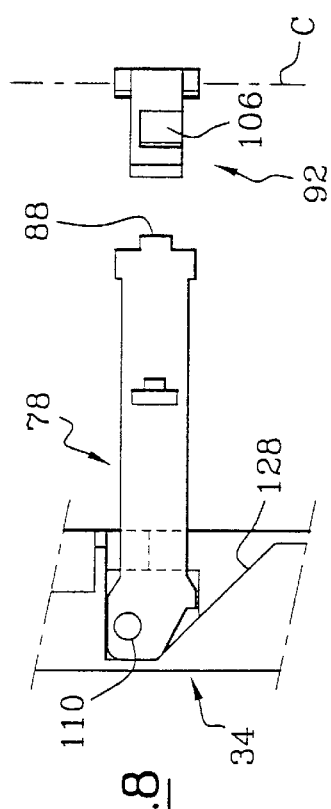

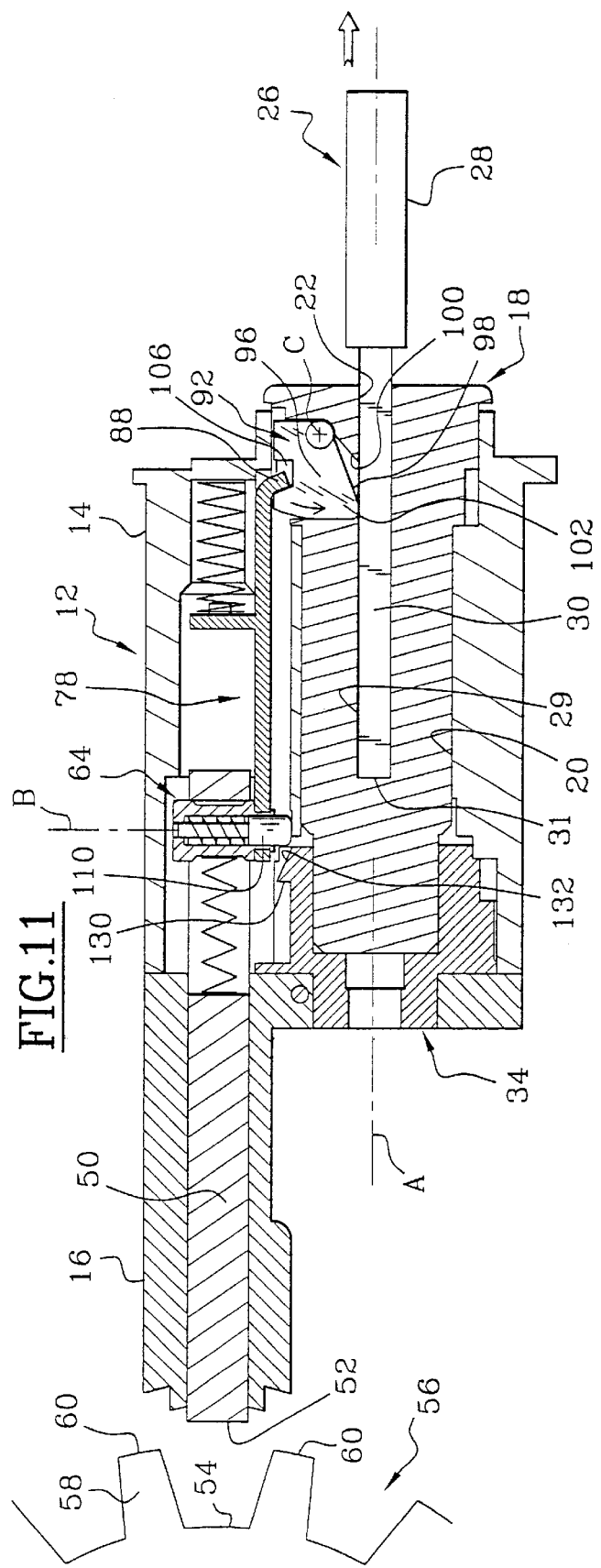

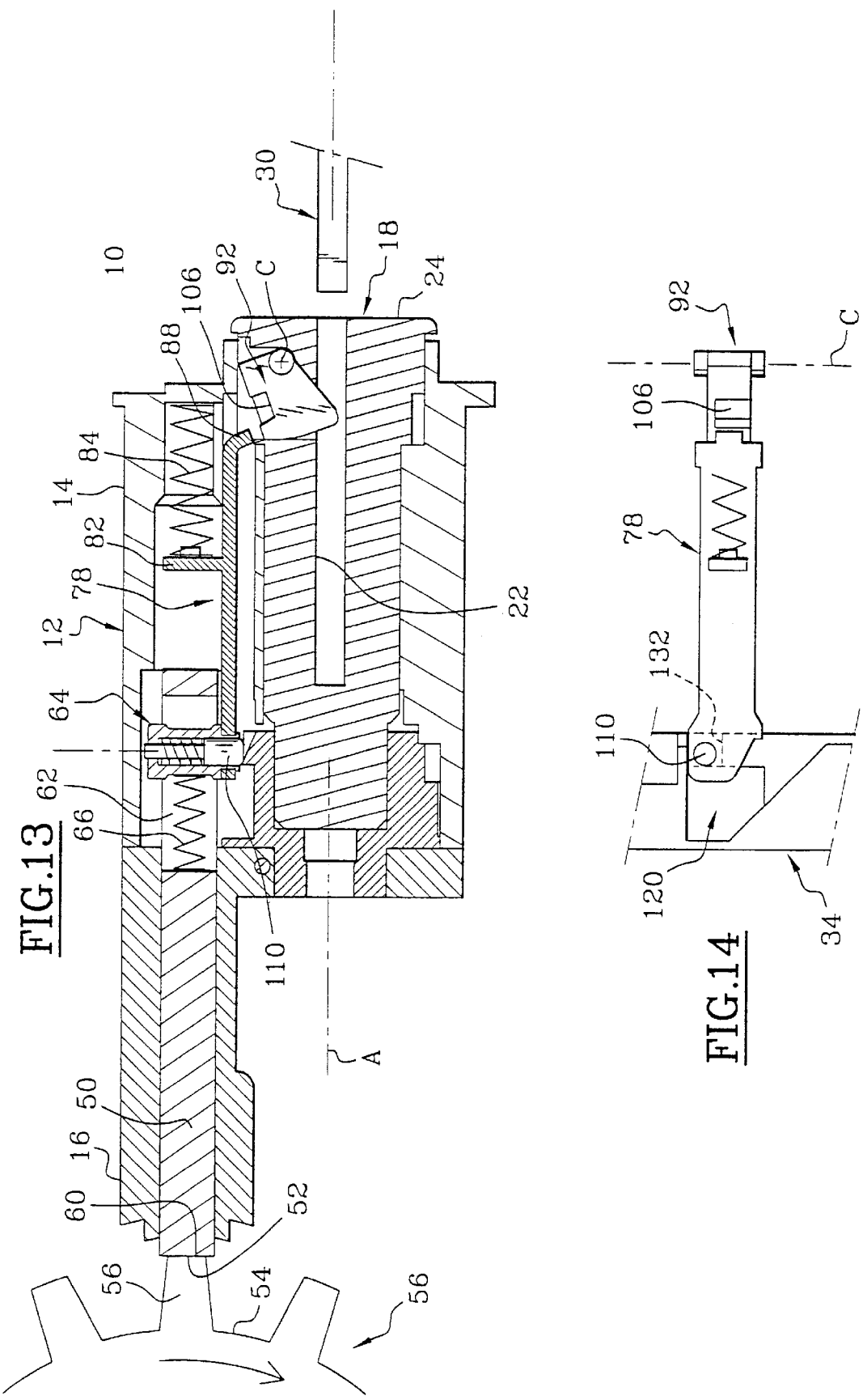

STEERING COLUMN ANTI-THEFT DEVICE FOR MOTOR VEHICLE

BACKGROUND OF THE INVENTION

The present invention concerns a motor vehicle steering column anti-theft device.

More precisely, the invention concerns a motor vehicle steering column anti-theft device of the type including a casing including a rotary lock which has an angular locking position in which a legitimate key can be axially introduced (conventionally from the rear towards the front) or removed, and at least one angular utilization position in which the key cannot be extracted from the lock, said lock including a rotary projecting part forming a cam that can cooperate with a control finger carried by a bolt to control the axial movements of said bolt which can slide in said casing in an axial direction between two positions: a retracted position in which it is retracted into said casing, and a forward anti-theft position towards which it is pushed elastically and in which it projects from said casing axially via a hole in said casing and prevents a part on the steering column from rotating when said lock is in said locking position with said key extracted.

DESCRIPTION OF THE PRIOR ART

There are several known examples of this type of anti-theft device which is most commonly used to prevent theft of vehicles, notably private cars.

Numerous perfections have been made to this type of anti-theft device, notably concerning the lock, to improve the strength of the device in response to known techniques used by vehicle thieves.

Nonetheless, in known devices there still exists the possibility of a thief attempting to push the bolt itself back into the casing of the anti-theft device, thereby releasing the steering column.

SUMMARY OF THE INVENTION

The present invention proposes a new design of a steering column anti-theft device of the type previously mentioned which overcomes this drawback by avoiding any possibility of pushing the bolt into the casing when the device is in its locking position, in other words in the position in which it blocks the rotation of the steering column.

The invention is therefore a motor vehicle steering column anti-theft device of the type including a casing in which a lock is mounted rotationally between an angular locking position in which a legitimate key can be axially introduced (conventionally from the rear towards the front) or removed, and at least one angular utilization position, in which said key cannot be extracted from the lock, said lock including a rotary projecting part (34) forming a cam that can cooperate with a control finger carried by a bolt to control the axial movements of said bolt which can slide in said casing in an axial direction between two positions: a retracted position in which it is retracted into said casing, and a forward anti-theft position towards which it is pushed elastically and in which it projects from said casing axially via a hole in said casing and prevents a part on the steering column from rotating when said lock is in said locking position with said key extracted, wherein:

said bolt carries a locking finger projecting radially towards the axis (A) of said casing and penetrating a locking recess formed in a lateral face of said projecting part when said bolt is in said forward anti-theft position, to prevent or limit movement of said bolt towards said retracted position;

said locking finger is automatically pushed out of said recess during rotation of said lock from said locking position into said utilization position;

said bolt is held in said retracted position, in the presence of said key, by mobile restraining means which move to an inoperative position in which said bolt is no longer held when said key is withdrawn According to other characteristics of the invention:

The part retaining the bolt is a pawl which is mounted pivoting on an axis perpendicular to the axis of the lock, this pawl having a surface which cooperates with the key to control its position, and a notch which can engage a restraining tab on the bolt to hold the bolt;

With the bolt in the restrained position, the notch of the pawl engages the restraining tab of radial orientation of the bolt. When the lock rotates from its utilization position to its locking position, the bolt restraining tab escapes tangentially from the notch;

The pawl with the notch is carried by the lock. In the presence of a key, this notch projects radially outwards where it can engage the restraining tab of radial orientation of the bolt;

When the pawl is in its retracted position, part of the pawl extends radially inside a keyhole formed in the lock, this part bounding the aforementioned surface of control of the movements of the pawl with which cooperates the key;

The bolt restraining tab is mounted at the rear free end of a rear part of the bolt which extends into the casing;

The locking finger can slide radially through bolt acting against a return spring which presses it permanently radially inwards in the direction of said locking recess;

The locking recess is delimited radially on the inside by a flat bottom of tangential orientation, and axially at the rear by a transversal stop surface with which the locking finger can cooperate to prevent or limit movement of the bolt towards its retracted position;

The locking recess is formed in a lateral cylindrical face of the projecting part and includes a lateral ramp which pushes said locking finger (110) out of the recess during said rotation of said lock (18) to a position in which it is in contact with a transversal cylindrical shoulder (114) on said projecting part (34) thereby retracting said bolt.

The bolt includes a rear part that is housed inside said casing and a front end that carries the locking finger.

BRIEF DESCRIPTION OF THE DRAWINGS

Other characteristics and advantages of the invention will appear on reading the detailed description below of a preferred embodiment with reference to the attached drawings of which:

FIG. 5 is a longitudinal sectional view in a vertical plane passing through the axis of rotation of the lock and the vertical sliding axis of the locking finger, in which the lock is shown in its angular locking position with the key withdrawn from the anti-theft device;

FIG. 6 is a top detailed drawing of some of the components of FIG. 5 including a flattened projection of the part forming a cam and showing the relative positions of the cam, the bolt control bar and the bolt locking part;

FIGS. 7 and 8 are similar views to those of FIGS. 5 and 6 in which the lock is shown in its angular locking position with a key inserted in the lock's keyhole;

FIGS. 11 and 12 are similar views to those of FIGS. 9 and 10 in which the lock is shown in its normal utilization position;

FIGS. 13 and 14 are similar views to those of FIGS. 5 and 6 in which the lock is shown in its angular locking position after removal of the key from the lock and in which the bolt is in its forward anti-theft position in contact with a summit of the splines of the steering column shaft.

DETAILED DESCRIPTION OF A PREFERRED EMBODIMENT

To facilitate the understanding of the description below and of the claims, terms such as "horizontal", "vertical", "upper", "lower" "front", "rear", etc. are used, notably in reference to the figures. However such use is understood to be non-limitative.

Figure 1:
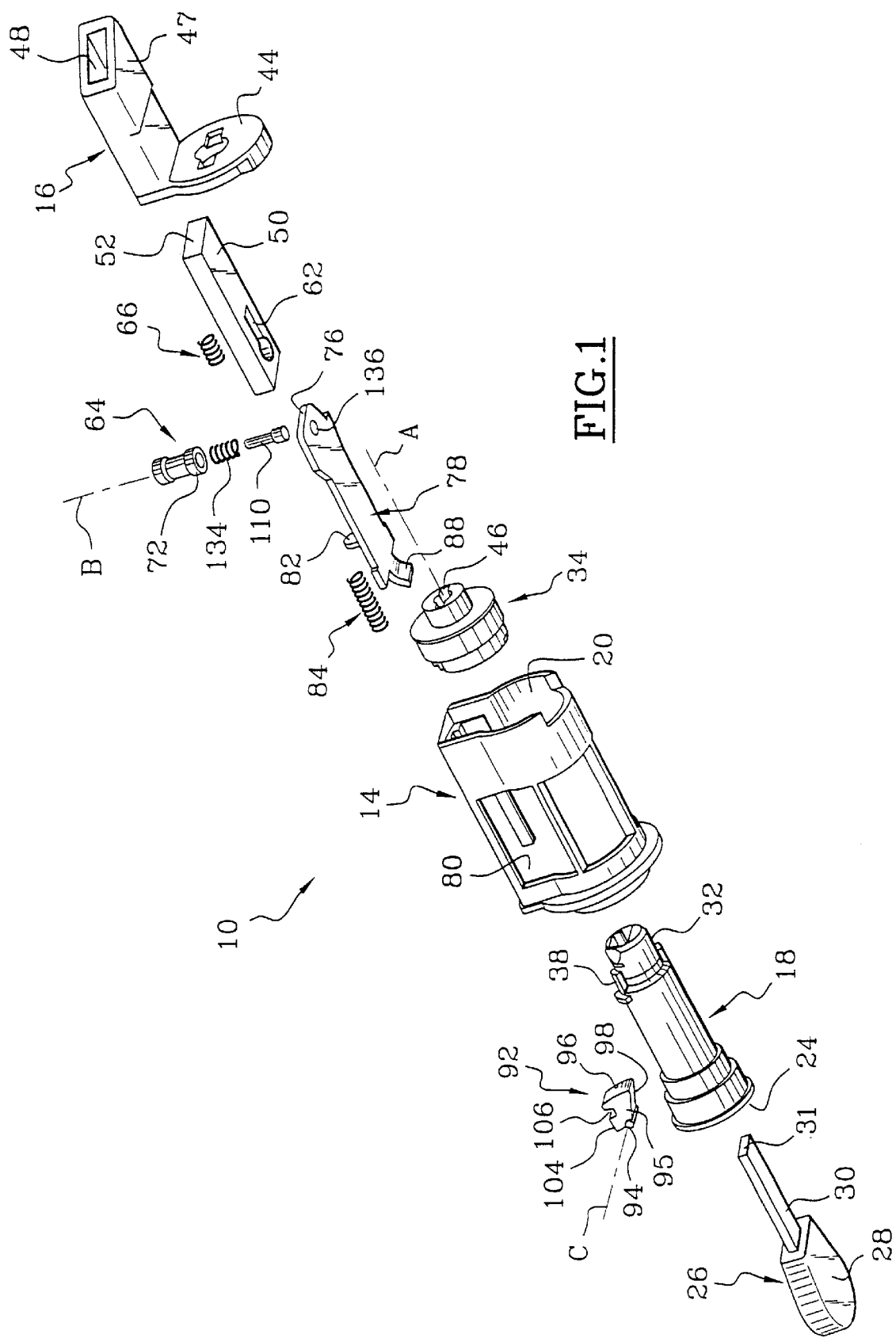
FIG. 1 is an exploded perspective view illustrating the main components of a motor vehicle steering column anti-theft device according to the invention, the view representing the casing of the anti-theft device.
Figure 2:
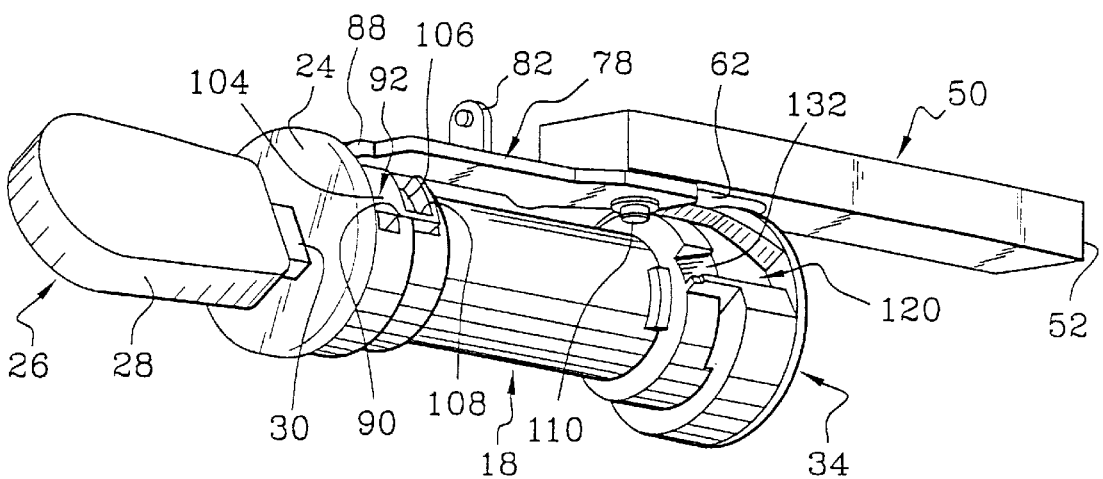
FIG. 2 is a detailed rear perspective view at larger scale which illustrates the main moving parts of the anti-theft device of FIG. 1, which are shown assembled with the lock in its angular utilization position with its locking bolt retained in its retracted position by the projecting part of the lock forming a cam.
Figure 3:
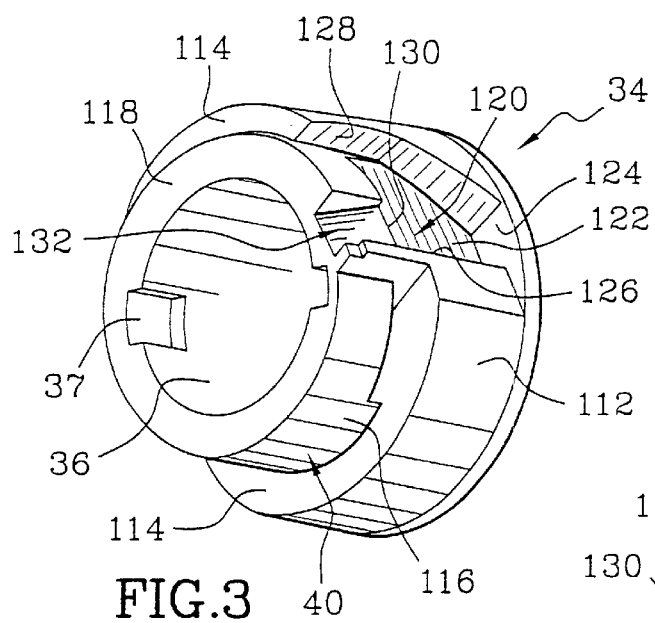
FIG. 3 is a large-scale rear perspective view of the projecting part of the lock forming a cam.

The figures show a motor vehicle anti-theft device 10 that includes a casing 12 made in two molded parts, a rear part 14 and a front part 16. The lower portion of the rear part 14 of the casing, as seen in FIG. 1, delimits a cylindrical bore 20 in which is fitted rotationally around the longitudinal axis A a rotary lock 18 which is here illustrated in a simplistic manner in the form of a rotor which is mounted axially from the rear and towards the front (from right to left in FIG. 5) in the rear part 14 of the casing 12.

The rotary lock 18, of the known general design, includes an axial keyhole 22 open at the rear transversal face 24 to enable axial insertion and extraction of a key 26 used to rotate the lock 18. For this purpose, the key 26 has a key head 28 and a key shank 30 that can be inserted in the keyhole 22 (the shank 30 and keyhole 22 are illustrated in a simplified manner in the figure as being complementary and of rectangular cross-section).

The front section of the free end 32 of the lock 18 is of reduced diameter. It can drive rotationally in both directions a projecting part 34 of a generally cylindrical shape which includes a rear internal bore of large diameter 36 which receives the front end 32 of the lock 18. The rotation of the part 34 by the lock 18 is assured by a lug 38 on the section 32 which engages a corresponding slot 37 in the bore 36.

The rotation of the cylindrical front part 40 of the projecting part, of smaller diameter than the main section, is guided by a hole 42 formed in the rear of the transversal plate 44 of the front part 16 of the casing 12.

The cylindrical front part 40 of the projecting part 34 has a hole 46 of rotationally asymmetrical shape that serves notably to drive rotationally an electric switch assembly (not shown in the figures) associated with the anti-theft device 10.

The top part of the front part 16 of the casing 12 forms a longitudinal sleeve 47 which extends longitudinally forwards from the plate 44, delimiting an internal passage 48 that guides the longitudinal sliding along the axis A of the body 50 of a locking bolt which is here of rectangular section and whose front free end 52 inserts into a groove or spline 54 parallel to a steering column shaft 56 whose axis of rotation is substantially perpendicular to the sliding direction of the bolt 50 and to the axis A of the lock.

The splines 54 are delimited circumferentially by one or more adjacent teeth 58 and radially by the summits 60 of these teeth.

The movement of the bolt 50 in both directions is controlled by a cylindrical peg 64 than fits in a longitudinal opening 62 in the rear longitudinal part of the bolt 50.

The peg 64 is a hollow cylinder whose vertical axis B is perpendicular to and passes through the axis A of rotation of the lock 18.

A compression spring 66, whose function is explained later, is mounted in the opening 62, bearing on the front end 68 of the opening 62 and on the control peg 64 such that this peg is permanently and elastically pressed against the rear end 70 of the opening 62.

One end 72 of the control peg 64 is fixed to the upper face 74 of the front part 76 of a control bar 78 associated with the bolt 50.

The control bar 78 is a horizontal plate parallel to the axis A which fits in a housing 80 formed in the top of the rear part 14 of the casing 12 above the lock 18. This housing 80 communicates with the bore 20 for the rotational guidance of the rotor 18.

About midway along its length the bar 78 has an upper transversal tab 82 that provides a support for a compression coil spring 84 whose rear end bears against a corresponding surface 86 on the rear part 14 of the casing 12 so as to solicit the bar 78 elastically, and therefore the bolt 50, through the spring 66, axially from the rear towards the front (from right to left in FIG. 5.

The axial rear end 88 of the bar 78 is narrower than the front end and is bent radially inward in the direction of the axis A to form a tab used to restrain the bar 78 and the bolt 50.

This tab 88 is orientated towards the cylindrical outer surface 89 of the body of the lock 18 which has, near the rear transversal face 24, an aperture 90 of substantially rectangular parallelepiped shape penetrating radially into the keyhole 22.

According to the invention, the aperture 90 houses a pivoting pawl 92 that restrains, in certain configurations, the bar 78 in its rearmost position.

For this purpose, the pawl 92 is mounted pivoting on an axis C perpendicular to the axis A. To provide for articulation, the body of the pawl 92 includes two pivot pins 94, perpendicular to its lateral faces 95 and 96 parallel to the axis A, which engage corresponding holes in the aperture 90.

To define the retracted position of the pawl 92, illustrated notably in FIG. 5, the oblique lower face 98 of the pawl bears against an inclined bottom 100 of the aperture 90. The lower front end 102 of the pawl body extends inside the keyhole 22 (FIG. 5).

To be able to engage the restraining tab 88 of the control bar 78, the upper face 104 of the pawl 92 is hook-shaped: it has a notch 106 opening towards the top and open on the lateral face 96 of the pawl 92 in the plane of FIG. 5, but closed in the opposite side by a wall 108.

In the retracted position of the pawl, illustrated notably in FIG. 5, the front part the upper face 104 of the pawl 92 is retracted inside the aperture 90, which means that the rear tab 88 of the bar 78 can move axially from the front towards the rear until it lies in the transversal plane of the notch 106, then engage this notch once the locking pawl 92 pivots upwards (clockwise in FIG. 5) around its axis C, as will be explained later.

In the position illustrated in FIG. 5, the lower face 98 of the pawl 92 pressing on the bottom 100 of the aperture 90 is inclined at about 45° and forms a ramp constituting a cam controlling the pivoting of the pawl 92 when the shank 30 of the key 26 is introduced axially into the keyhole 22, under the action of the free end 31 of the key that encounters the lower face 98 of the pawl 92.

In the presence of the key shank 30 in the keyhole 22, the pawl 92 is held in its restraining position (FIGS. 7 and 11) in which it can engage the restraining tab 88 of the bar 78, because the lower face 98 of the pawl 92 is pressing against a lateral face 29 of the shank 30 of the key 26.

The projecting part 34 forming a cam and the locking pin 110 with which it cooperates will now be described in detail.

The main section of the projecting part 34, of greatest diameter, is delimited by a cylindrical surface forming a peripheral face 112 delimited axially towards the rear by an annular shoulder 114. The rear of this part 34 is extended by an external cylindrical surface 116 of smaller diameter delimited by the annular rear transversal face 118.

In the cylindrical surface 112 there is a locking recess 120. This recess is delimited radially inwards by a flat bottom 122 of tangential orientation; it is delimited axially to the front by a transversal face 124, and laterally by a vertical face 126 of axial orientation on one side and, on the other side, by a vertical face in two sections at different angles to the axis A together forming a cam or ramp 128 which extends from the front transversal face 124 to the cylindrical shoulder 114; the recess 120 is delimited axially at the rear by a vertical transversal stop surface 130.

To enable the locking pin 110 to enter the locking recess 120 as the pin moves axially from the rear towards the front, there is an entry ramp 132 extending and sloping axially from the rear annular transversal face 118 to the transversal stop surface 130.

The locking pin 110 can slide radially along the axis B inside the hollow cylindrical peg 64 and it is permanently pressed elastically by a looking spring 134 radially inward in the direction of the axis A through a hole 136 in the rear part 76 of the bar 78.

The locking pin 110 is therefore integrated in the control peg 64 in which it can slide only radially along the axis B, the axial position of the locking pin 110 determining the axial position of the bar 78 and the axial position of the control peg 64 which acts on the bolt 50 via the spring 66.

The operation the anti-theft device 10 will now be described, starting from the position illustrated in FIGS. 5 and 6.

In this locking position, the bolt 50 is in its forward (anti-theft) position in which the free end 52 is engaged in a groove 54 and it is permanently pushed forward towards this position by the spring 66.

In this locking position illustrated in FIGS. 5 and 6, the spring 66 pushes the bar 78 axially from the rear towards the front with its front transversal edge 76 bearing against the transversal face 124 of the locking recess 120.

If a thief attempts to push the bolt axially from front to rear (from left to right in FIGS. 5 and 6), the bolt 50 moves the control peg 64, once the spring 66 is fully compressed, and therefore the locking pin 110 which is engaged in the locking recess 120 and presses against the bottom 122 of this recess.

The attempt to move bolt 50 brings the locking pin 110 against the transversal stop surface 130 of the locking recess 120, which prevents sufficient withdrawal of the bolt 50 into the anti-theft casing 12, and therefore prevents freeing of the steering column shaft 56.

When the user introduces a legitimate key 26 in the keyhole 22, as in FIGS. 7 and 8, the restraining pawl 92 is pivoted clockwise around its axis C.

When the bar 78, as seen in FIGS. 7 and 8, is in its forward position corresponding to the anti-theft position of the bolt 50, the rear restraining tab 88 of the bar 78 is not opposite the pawl 92, so when the pawl is pivoted by the insertion of the key the tab 88 is not engaged in the notch 106 in the pawl 92.

Figures 9, 10:
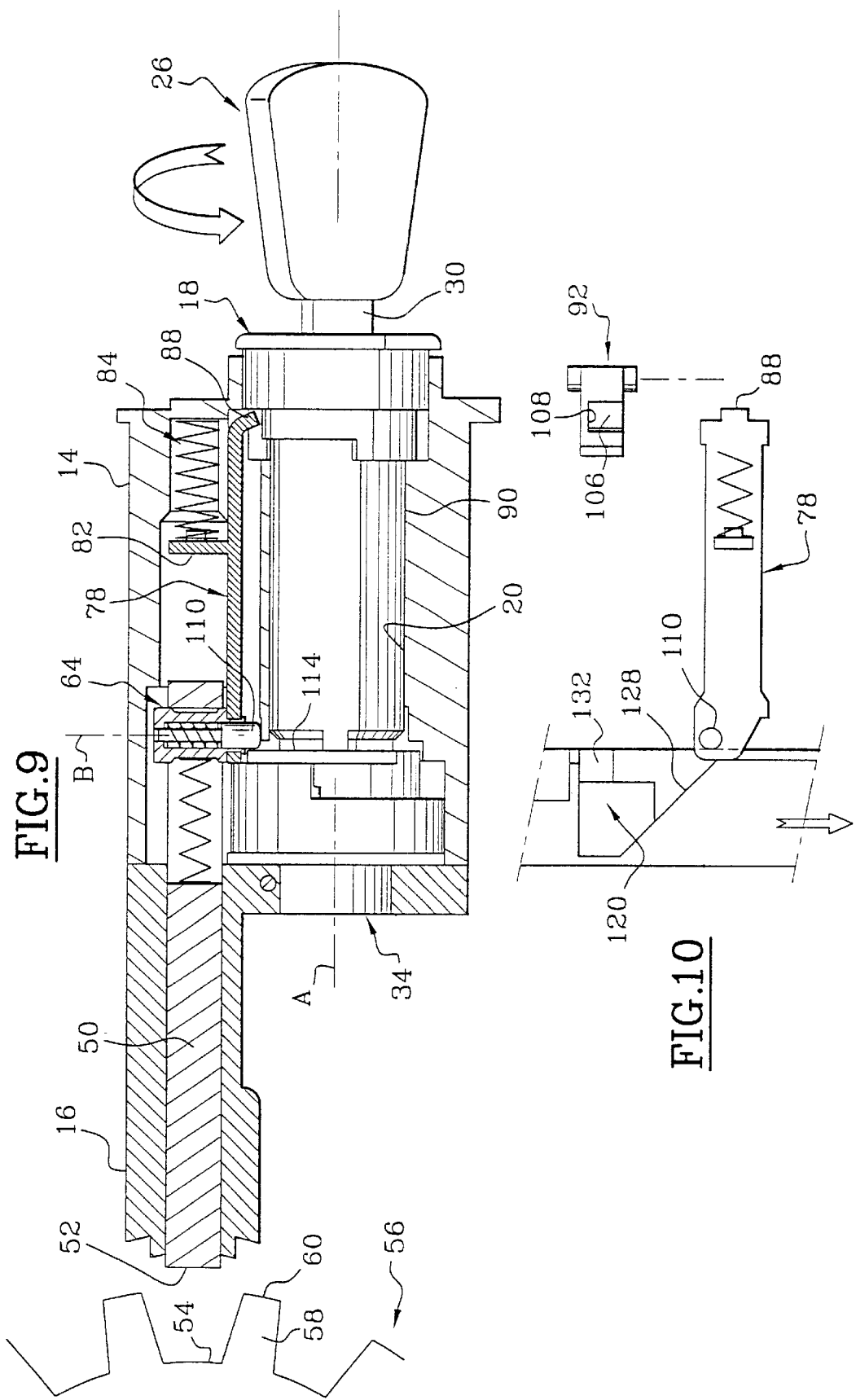
FIGS. 9 and 10 are similar views to those of FIGS. 7 and 8 in which the lock is shown in an intermediate angular utilization position.

The use of the anti-theft device to allow engine starting and use of the vehicle then requires turning the key in the direction indicated by the arrow of FIG. 7 until the configuration is that of the intermediate utilization position illustrated in FIGS. 9 and 10 in which the lock 18 has been rotated from its locking position (FIGS. 7 and 8).

The rotation of the key 26 and the rotor 18 causes the same rotation in the same direction of the projecting part 34.

Figure 4:
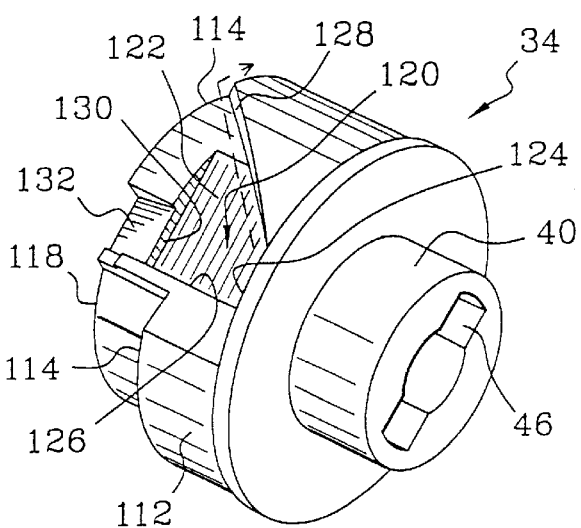
FIG. 4 is a large-scale front perspective view of the projecting part of the lock forming a cam.

During this rotation, the locking pin 110 encounters the ramp 128 which causes it to exit the locking recess 120, following the route indicated by a dashed arrow in FIG. 4, and find itself in contact with the cylindrical shoulder 114 (FIG. 9).

This exit of the locking pin 110 also causes an axial movement from front to rear of the control peg 64, which disengages the bolt 50 from the splines 54 and releases the steering column shaft 56.

As seen in FIG. 10, the rotation changes the relative angular position between the lock rotor 18 and the bar 78. The restraining pawl 92 which is part of the rotor 18 remains in its active position in which it projects radially outwards, whereas the rear restraining tab 88 of the bar 78 moves axially towards the rear to a position where it is aligned transversally with the notch 106 of the restraining pawl 92 and can therefore engage this notch in a tangential direction, as described below.

From the intermediate utilization position illustrated in FIGS. 9 and 10, once the vehicle's engine has started, the user releases the key 26 and elastic means (not shown) rotate the lock 18 back to its normal utilization position illustrated in FIGS. 11 and 12.

During this movement of the lock 18, the restraining tab 88 enters the notch 106 until it comes into contact tangentially with the wall 108. The restraining pawl 92 remains in its upper position in which it projects radially and retains the bar 78 axially. The bolt 50 is therefore also retained (via the control peg 64 in contact with the rear face 70 of the opening 62), and the steering column shaft 56 remains free to rotate.

As seen in FIG. 11, in this configuration the locking pin 110 lies at the entry to the ramp 130 but it does not participate directly in the restraint of the bolt 50, since this is assured by the pawl 92 holding the restraining tab 88 of the bar 78.

Starting from the position illustrated in FIG. 11, when the user withdraws the key axially from front to rear, the shank 30 leaves the keyhole 22 and restraining pawl 92 falls back into the keyhole 22, pivoting anti-clockwise direction about its axis C.

This pivoting frees the restraining tab 88 which is then no longer held by the notch 106 and the bar 78 is pushed elastically forwards (from right to left in FIG. 11) by the spring 84 and returns to the position shown in FIG. 5. During this movement of the bar 78 and the bolt 50 towards the forward position in which the steering column shaft 56 is locked, the locking pin 110 slides up the ramp 130 and enters the locking recess 120 again and presses against the bottom 122 of the recess under the effect of the locking spring 134.

If the bolt 50 engages a summit 60 of one of the steering column splines 56 rather than a groove 54, the forward axial travel of the bolt is limited and it is left in the intermediate position illustrated in FIGS. 13 and 14 thanks to the presence of the spring 66.

The bar 78 with the control peg 64 and the locking pin 110 stop in an intermediate axial position with the locking peg 64 bearing against the spring 66, whose turns are fully compressed, fitted in the opening 62 of the bolt 50.

The driver then rotates the steering column shaft 56 slightly to enable the bolt 50 to spring into a groove 54 and thereby complete the locking.

In this angular position of the steering column shaft 56, the bolt 50 with the bar 78 move axially forwards into the position illustrated in FIGS. 5 and 6.

What is claimed is:

1. A motor vehicle steering column anti-theft device including a casing in which a lock is mounted rotationally between an angular locking position in which a legitimate key can be axially introduced or removed, and at least one angular utilization position, in which said key cannot be extracted from the lock, said lock including a rotary projecting part forming a cam that can cooperate with a control finger carried by a bolt to control the axial movements of said bolt which can slide in said casing in an axial direction between two positions: a retracted position in which it is retracted into said casing, and a forward anti-theft position towards which it is pushed elastically and in which it projects from said casing axially via a hole in said casing and prevents a part on the steering column from rotating when said lock is in said locking position with said key extracted, wherein:

said casing defines an axis (A) and said bolt carries a locking finger projecting radially towards the axis (A) of said casing and penetrating a locking recess formed in a lateral face of said projecting part when said bolt is in said forward anti-theft position, to prevent or limit movement of said bolt towards said retracted position;

said locking finger is automatically pushed out of said recess during rotation of said lock from said locking position into said utilization position;

said bolt is held in said retracted position, in the presence of said key, by mobile restraining means which move to an inoperative position in which said bolt is no longer held when said key is withdrawn.

2. An anti-theft device according to claim 1, wherein said restraining means are a pawl which can pivot about an axis (C) perpendicular to the axis (A) of said lock and of which a control surface cooperates with said key to control the position of the pawl, and of which another surface includes a notch which can engage a restraining tab on said bolt to hold said bolt.

3. An anti-theft device according to claim 2, wherein, when said bolt is in said axially retracted position, said notch engages said restraining tab of radial orientation on said bolt, and wherein, during the rotation of the lock from said utilization position into said locking position, said restraining tab escapes tangentially form said notch.

4. An anti-theft device according to claim 3, wherein said lock carries said pawl with said notch which, in the presence of a key, projects radially outwards in which position it can engage said restraining tab of radial orientation of said bolt.

5. An anti-theft device according to claim 4, wherein when said pawl is in its retracted position, part of said pawl extends radially into a keyhole in said lock, this part delimiting said control surface that controls the position of said pawl and cooperates with said key.

6. An anti-theft device according to claim 2, wherein said restraining tab is mounted at the rear free end of a rear part of said bolt which extends into said casing.

7. An anti-theft device according to claim 1, wherein said locking finger can slide radially through said bolt acting against a return spring which presses it permanently radially inwards in the direction of said locking recess.

8. An anti-theft device according to claim 1, wherein said locking recess is delimited radially by a flat bottom of tangential orientation, and axially at the rear by a transversal stop surface with which the locking finger can cooperate to prevent or limit movement of the bolt towards its retracted position.

9. An anti-theft device according to claim 1, wherein said locking recess is formed in a lateral cylindrical face of the projecting part and includes a lateral ramp which pushes said locking finger out of the recess during said rotation of said lock to a position in which it is in contact with a transversal cylindrical shoulder on said projecting part thereby retracting said bolt.

10. An anti-theft device according to claim 1, wherein said bolt includes a rear part that is housed inside said casing and whose front end carries said locking finger.

* * * * *